United States Patent
Dua et al.

(10) Patent No.: US 10,599,760 B2
(45) Date of Patent: Mar. 24, 2020

(54) INTELLIGENT FORM CREATION

(71) Applicant: Adobe Inc., San Jose, CA (US)

(72) Inventors: Varun Dua, Bangalore (IN); Suvrat Chaturvedi, Noida (IN); Deepak Kumar, Noida (IN); Ankur Jain, Noida (IN)

(73) Assignee: Adobe Inc., San Jose, CA (US)

( * ) Notice: Subject to any disclaimer, the term of this patent is extended or adjusted under 35 U.S.C. 154(b) by 128 days.

(21) Appl. No.: 15/692,627

(22) Filed: Aug. 31, 2017

(65) Prior Publication Data

US 2019/0065455 A1     Feb. 28, 2019

(51) Int. Cl.
| | | |
|---|---|---|
| *G06F 17/24* | (2006.01) | |
| *G06F 16/22* | (2019.01) | |
| *G06F 16/2457* | (2019.01) | |
| *G06F 17/22* | (2006.01) | |

(52) U.S. Cl.
CPC ............ *G06F 17/243* (2013.01); *G06F 16/22* (2019.01); *G06F 16/24578* (2019.01); *G06F 17/2247* (2013.01)

(58) Field of Classification Search
CPC .................................................. G06F 17/243
USPC .......................................................... 715/222
See application file for complete search history.

(56) References Cited

U.S. PATENT DOCUMENTS

| | | | |
|---|---|---|---|
| 2007/0192679 A1* | 8/2007 | Foushee, Jr. .......... | G06F 17/243 715/205 |
| 2008/0215976 A1* | 9/2008 | Bierner ................. | G06F 17/243 715/708 |
| 2011/0131479 A1* | 6/2011 | Padgett ............... | G06F 3/04895 715/223 |
| 2016/0314109 A1* | 10/2016 | Singh ................... | G06F 17/2229 |
| 2017/0220541 A1* | 8/2017 | Dayama ................ | G06F 16/334 |
| 2018/0143958 A1* | 5/2018 | Kakkad ................. | G06F 17/243 |

OTHER PUBLICATIONS

Strmečki, Daniel, Danijel Radošević, and Ivan Magdalenić. "Web form generators design model." In 26th Central European Conference on Information and Intelligent Systems (Ceciis 2015). 2015. (Year: 2015).*

(Continued)

*Primary Examiner* — Frank D Mills
(74) *Attorney, Agent, or Firm* — Finch & Maloney PLLC

(57) ABSTRACT

Electronic form creation techniques are disclosed which automatically recommend candidate form objects to include in an electronic form being created. In some examples, a method may include receiving a request to create an electronic form, identifying a preceding N form objects created in the electronic form, identifying a candidate form object based on the identified preceding N form objects and one or more relationships between pre-existing form objects, and recommending the candidate form object for creation in the electronic form. The pre-existing form objects are included in multiple pre-existing forms. The method may further include identifying the one or more relationships between pre-existing form objects. The pre-existing forms may be selected, for example, based on information associated with the request (e.g., form type, an ID indicating identity of author creating the form, and/or ID indicating identity of a group to which the form author belongs).

20 Claims, 5 Drawing Sheets

(56) References Cited

OTHER PUBLICATIONS

Hochreiter, S., et al., "Long Short-Term Memory", Neural Computation, 1997, vol. 9, pp. 1735-1780.

"Stemming and lemmatization", Cambridge University Press, 2008, Retrieved from the Internet: URL:https://nlp.stanford.edu/IR-book/html/htmledition/stemming-and-lemmatization-1.html, 3 pages. [retrieved May 5, 2017].

"Stemming", Wikipedia, Retrieved from the Internet: URL:https://en.wikipedia.org/wiki/Stemming, 9 pages. [retrieved on May 5, 2017].

"Lemmatisation", Wikipedia, Retrieved from the Internet: URL:https://en.wikipedia.org/wiki/Lemmatisation, 3 pages. [retrieved on May 5, 2017].

\* cited by examiner

INTELLIGENT FORM CREATION

FIELD OF THE DISCLOSURE

This disclosure relates generally to electronic forms, and more particularly, to techniques to automatically recommend form objects to facilitate intelligent electronic form creation.

BACKGROUND

A form is a document with data fields or spaces into which data or information is to be entered. For example, a person can complete a form by writing or entering information into the fields of the form. Digital data capture is becoming a primary part of the service offerings by government and business organizations. Competitive pressures, demanding customers, and cost considerations are putting pressure on organizations to accelerate the digitization of their business processes, including the use of electronic forms for their data capture and management needs. There is also pressure on the organizations to continuously improve upon the time it takes from collating the business requirements to implementing the electronic data capture experience (e.g., the use of electronic forms) while providing improved customer experience. However, creating electronic forms using current form authoring solutions can be arduous. Moreover, electronic forms generated using the current form authoring solutions fail to provide the necessary customer experience sought by the form creators.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
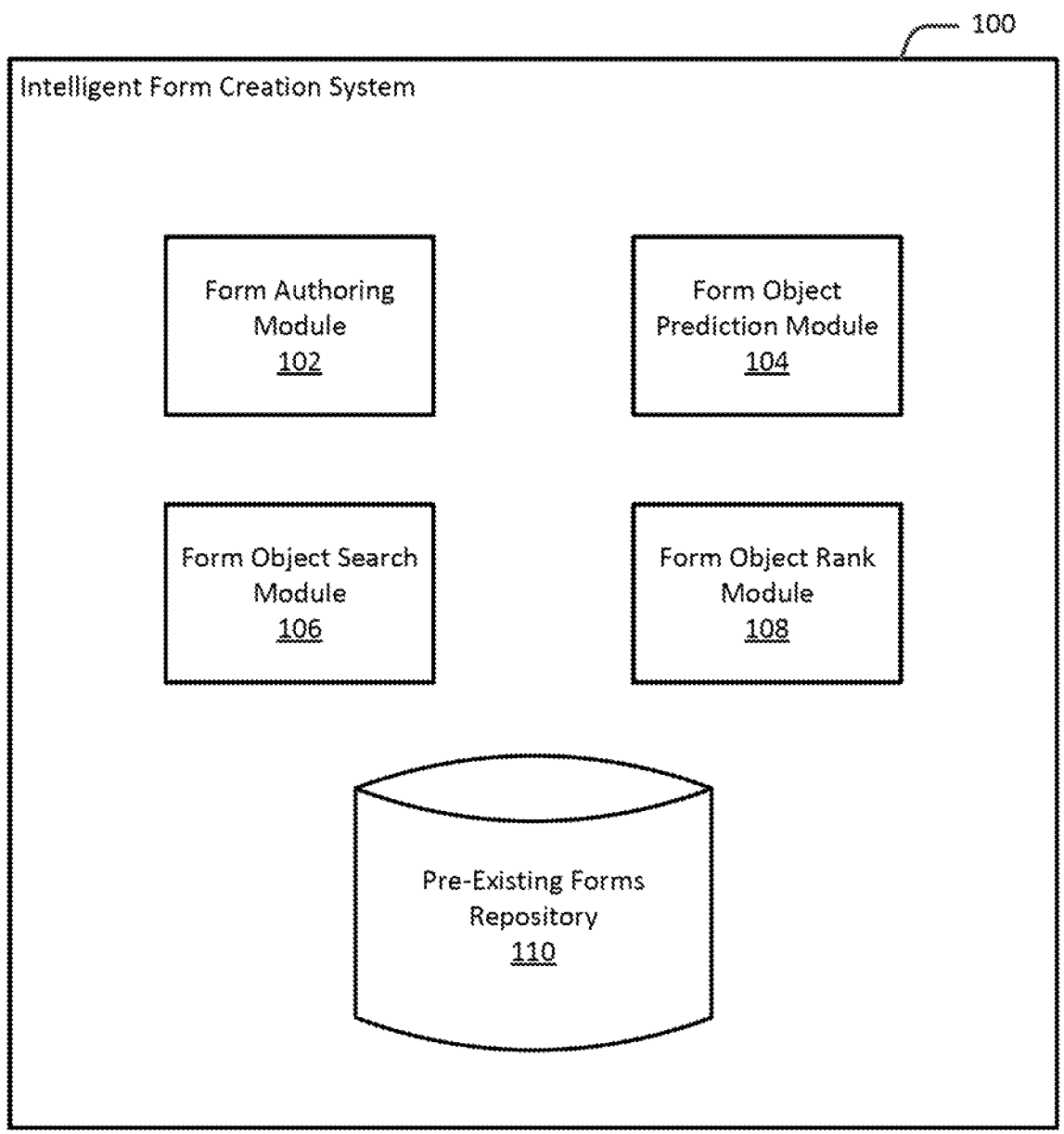
FIG. 1 illustrates selected components of an example intelligent form creation system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Various authoring solutions allow for the authoring of electronic forms. Many of the current authoring solutions permit a form author to create an electronic form field by field, and section by section. With many of the current authoring solutions, the form author is responsible for providing the desired settings and related data, such as data field label, rules, styles, error text, help text, etc., for each form object included in the electronic form. For schema-based form objects, the form author needs to ensure that such form objects included in the electronic form map to the correct schema objects. By way of example, an input text form object included in the electronic form may need to map to a specific schema element type. In this instance, the form author may need to generate a rule for the form object that ensures that the form object properly maps to the schema element type. Some of the current authoring solutions allow for the importing of a data schema (e.g., a database table converted to JavaScript Object Notation (JSON) or eXtensible Markup Language (XML) schema), which may be used in ensuring that form objects map to the correct schema element types. However, as previously noted, creating electronic forms using current authoring solutions can be arduous. For example, although there often are overlaps between parts and/or sections of many existing forms (e.g., many form objects are common across existing forms with minor differences), current authoring solutions fail to automatically leverage this commonality, and require the form author to manually create the electronic form from scratch. In addition, from existing schema based forms, there is information regarding mappings between form objects and schema element types. However, current authoring solutions fail to automatically leverage the schema information provided by existing schema based forms. The current authoring solutions also fail to leverage analytics data (e.g., metrics) associated with the form objects in existing forms in facilitating the creation of an electronic form.

To this end, techniques are disclosed herein for providing intelligent electronic form creation by automatically predicting and recommending candidate form objects to include in an electronic form. The techniques leverage knowledge derived or obtained from pre-existing form objects included in pre-existing forms, to identify and automatically recommend candidate form objects for inclusion in the electronic form that is being created. The leveraged knowledge includes relations between the pre-existing form objects, and, in some embodiments, other information regarding the pre-existing form objects. The pre-existing forms may be identified, for example, based on the known information associated with the electronic form to be created. For example, a request to create a job application form (or any other specific type of electronic form) may be used to trigger use of a number of pre-existing job application forms accessible via one or more databases. In other embodiments, the pre-existing forms may be specific to a form author that is creating an electronic form, or a database of forms maintained by or for or otherwise associated with that author. For example, in the case of the form author belonging to a specific organization, the pre-existing forms may be provided by the form author and/or the specific organization to which the form author belongs, or automatically selected and provided based on the identity of the form author. Additionally or alternatively, the pre-existing forms may be existing forms that are generally available and accessible for public use. Moreover, these existing forms may be specific to a domain, such as an industry, a business, a service, government, and the like. In a more general sense, the pre-existing forms can come from any number of sources, and may be specific to a particular category of forms (e.g., forms specific to an industry such as tax forms, or forms specific to an application such as job application forms, etc.) or alternatively may be a diverse set of forms that cover multiple diverse applications. Thus, while having access to categorized forms provides certain advantages with respect to efficiency, such categorization of the pre-existing forms is not necessary. To this end, in some embodiments, the pre-existing forms are unrelated or otherwise selected in an arbitrary fashion with respect to the form being created.

In any such cases, a sufficient number of pre-existing forms, including the pre-existing form objects included in those pre-existing forms, may be analyzed to identify relationships between pre-existing form objects (e.g., relationships between two or more pre-existing form objects). For example, the analysis of the pre-existing form objects may identify or reveal a relationship between a pre-existing form object with a label "first name" and a pre-existing form object with a label "last name". In some example cases, the identified relationship may be a pattern or sequence or logical construct that indicates that the pre-existing form object with the label "last name" appears or is present after the pre-existing form object with the label "first name" (e.g., if "first name", then "last name"). Another relationship may indicate, for instance, that a pre-existing form object with a label "middle initial" appears or is present after the pre-existing form objects with the labels "first name" and "last name" (e.g., if "first name" and "last name", then "middle initial"). Some identified relationships may indicate sets of pre-existing form objects that appear together in the pre-existing forms. For example, one set of pre-existing form objects may include the pre-existing form objects with the labels "email address", "telephone number", and "street address". Another set of pre-existing form objects may include, for example, the pre-existing form objects with the labels "medical history" and "nature of disease". Additionally or alternatively, some identified relationships may indicate locations of one or more pre-existing form objects relative to one or more other pre-existing form objects in a relationship. The specific examples of the relationships between pre-existing form objects provided above is for illustration, and one skilled in the art will appreciate that there may be any number of relationships, including relationships between different pre-existing form objects and different numbers of pre-existing form objects than those illustrated in the examples above.

In any case, the identified relationships between pre-existing form objects may be analyzed to determine a requisite number of form objects, N, that is typically needed in order for a search of the relationships between pre-existing form objects to likely result in a good match (e.g., result in identifying a relationship between pre-existing form objects based on the N form objects most recently created in the electronic form). That is, the relationships between the pre-existing form-objects may be analyzed to determine a value for N that is likely needed to make a good prediction as to a field to recommend for creating next in the electronic form (also referred to herein as a "next candidate field") based on the existing relationships. The matching relationship (e.g., a relationship between pre-existing form objects that is identified based on the N form objects most recently created in the electronic form) indicates or identifies a candidate field. For example, suppose that the example relationship, if "first name" and "last name", then "middle initial", is the matching relationship. Then, the candidate field, as indicated by the matching relationship, is a field for "middle initial". That is, based on the preceding N objects created in the electronic form and the relationships between pre-existing form objects, a field for "middle initial" may be recommended for creating next in the electronic form. The significance of the value of N is that a search of the relationships between pre-existing form objects for a matching relationship is not made until N form objects are created or included in the electronic form. For example, the analysis of the relationships between pre-existing form objects may indicate that ten (N=10) form objects are needed to likely identify a matching relationship. The value for the requisite number of form objects, N, specified in the foregoing example is for illustration, and one skilled in the art will appreciate that the value of N may be based on the relationships between pre-existing form objects and may be a different value, including a very small number or a very large number.

Once the candidate field is determined, a search of the pre-existing form objects may be made for matching pre-existing form objects. That is, a search of the pre-existing form objects may be made to identify pre-existing form objects that are appropriate (e.g., that have been used in the pre-existing forms) for the candidate field. The search of the pre-existing form objects may be conducted using a description (e.g., a label, word, phrase, etc.) of the candidate field to identify pre-existing form objects that have the same meaning (or, in some cases, have the same or similar meaning) as the description of the candidate field. A candidate form object (e.g., a candidate form object for (that corresponds to) the candidate field) may be determined from the matching pre-existing form objects. In the instance where the search of the pre-existing form objects identifies one matching pre-existing form object, the candidate form object is the one matching pre-existing form object. In the instance where the search of the pre-existing form objects identifies multiple matching pre-existing form objects, the candidate form object may be one matching pre-existing form object from the multiple matching pre-existing form objects. For example, the multiple matching pre-existing form objects may be ranked, for example, based on one or more analytics metrics, and the candidate form object may be the highest ranked matching pre-existing form object. In some embodiments, the candidate form object may include or be comprised of multiple matching pre-existing form objects.

Accordingly, a candidate form object to include in an electronic form may be determined based on the preceding N form objects created in the electronic form and the relationships between pre-existing form objects included in the pre-existing forms. The candidate form object may be presented to the form author for inclusion in the electronic form. Additionally or alternatively, the form author may specify a value for N. For example, the form author, having knowledge of the type of electronic forms that is to be created, may appropriately specify a value for N.

As used in this disclosure, the term "electronic form" refers to a document that allows data to be entered into the form using a computer. Some examples of an electronic form include a render-based file format document, such as a Portable Document Format or PDF document, an image (e.g., bitmap or JPEG) of a form, and a Microsoft Word or Excel document, to name a few examples. In a more general sense, any electronic document having a visible structure can be an electronic document. In some instances, an electronic form may retain the appearance of a paper-based form.

As used in this disclosure, the term "form object" refers to a type of input mechanism that facilitates data or information input, including widgets and images, into an electronic form. A form object may be akin to a form field, which may be a region of an electronic form where data can be entered by a user. Examples of form objects may include a text field (e.g., for entry of any type of alphanumeric text), a hidden field (e.g., for storing information entered by a user, such as a name, e-mail address, or viewing preference, and the like, for subsequent use, for example, when the user next accesses the electronic document), a button (e.g., for selecting an action), a check box (e.g., for allowing multiple responses within a group of options), a radio button (e.g., for representing exclusive choices), a list menu (e.g., for displaying option values within a scrolling list that allows users to select an option), a jump menu (e.g., for inserting a menu of options that are links, for example, to a document or a file), a file field (e.g., for browsing and uploading a file as a form of data), an image field (e.g., for inserting an image in the electronic form), static text, and the like. A form object may have associated therewith a label or title that identifies the form object. In some cases, a form object may also have associated therewith help text, help content, error message or text, tooltip, etc.

As used in this disclosure, the term "candidate form object" refers to a form object that is automatically recommended or otherwise suggested to a user for inclusion (creation) in an electronic form. A user may be given the ability to select and create, or not select and not create, the candidate form object in the electronic form. A candidate form object may, in some cases, include a list of several form objects from which the user is given the ability to select one or more form objects for creation in the electronic form. In some cases, the list of several form objects may be a ranked list of form objects. In still other embodiments, the candidate form object is automatically included (created) in the electronic form being created, so as to liberate the author from the decision process. Note that, in some such embodiments, auto-inclusion of candidate form object is a user-configurable setting, as some users may not care for such auto-inclusion.

In some embodiments, a computer-implemented method to automatically recommend a candidate form object to include in an electronic form may include receiving a request to create an electronic form. A form author may submit the request to create the electronic form. Upon receiving the request, pre-exiting forms may be analyzed to identify relationships between pre-existing form objects that are included in the pre-existing forms. Note that in some embodiments this analysis of pre-existing forms may be done in advance and need not be done in real-time or otherwise contemporaneously with the request to create the electronic form. In some embodiments, the form author may provide and/or specify the pre-existing forms that are to be analyzed for relationships between pre-existing form objects. In still other embodiments, the pre-existing forms that are to be analyzed for relationships between pre-existing form objects are automatically specified or identified based on information indicated by the request, such as form type or other contextual information from which details of the form being created can be inferred. Additionally or alternatively, the pre-existing forms provided and/or specified by the form author and/or request or otherwise provisioned may be supplemented with generally available pre-existing forms, for example, additional pre-existing forms that may be specific to a domain, such as an industry, a business, a service, government, and the like.

The relationships between pre-existing form objects may be analyzed to determine a value for N. As discussed above, N is the requisite number of form objects that is typically needed for a search of the relationships between pre-existing form objects to result in a match (e.g., result in identification of a relationship between pre-existing form objects that is identified based on the N form objects). For example, the analysis may indicate that seven (7) form objects may be needed for a search of the relationships between pre-existing form objects to result in identification of a matching relationship. In this instance, an attempt may be made to search the relationships between pre-existing form objects for a matching relationship once the form author creates seven (7) form objects in the electronic form. That is, no attempts are made to search the relationships between pre-existing form objects until the form author creates the requisite seven (7) form objects in the electronic form. Once the form author creates at least the requisite N form objects in the electronic form, the preceding N form objects created in the electronic form may be identified and used to search the relationships between pre-existing form objects for a matching relationship. The matching relationship may be used to identify a candidate field. Continuing the previous example, once the form author creates seven (7) form objects in the electronic form, the preceding seven (7) form objects created in the electronic form (e.g., all of the form objects created by the form author) may be used to search the relationships between pre-existing form objects. Once the form author creates the next form object in the electronic form (e.g., the $8^{th}$ form object), the preceding seven (7) form objects created in the electronic form (e.g., the $2^{nd}$ to $8^{th}$ form objects created in the electronic form) may be used to search the relationships between pre-existing form objects. The identity of the candidate field may be determined from the matching relationship. Once determined, the description of the candidate field may be used to search the pre-existing form objects for a match (e.g., a pre-existing form object that matches the description of the candidate field), and the matching pre-existing form object may be identified as a candidate form object. The identified candidate form object may be recommended for inclusion in the electronic form. For example, a representation of the identified candidate form object may be presented, via a graphical user interface (GUI), for inclusion by the form author in the electronic form. The form author may create the candidate form object, for example, by clicking and dragging the representation of the candidate form object to a desired location on the electronic form using a suitable pointing device. Creating the candidate form object in the electronic form in effect creates a field (e.g., the candidate field that resulted in the candidate form object) in the electronic form that is associated with the candidate form object. The form author may decide not to create the candidate form object in the electronic form. Rather, the form author may create other form objects and/or create form objects without using the candidate form object. Additionally or alternatively, the form author may create the candidate form object at a later time (e.g., after creating one or more other form objects in the electronic form). In some embodiments, one or more form object constructs associated with the candidate form object, such as help content, error message, tooltip, to name a few, may be automatically created along with the candidate form object in the electronic form.

In some embodiments, the descriptions or labels of the form objects created in the electronic form (e.g., the N form objects) may be used to search the relationships between pre-existing form objects to identify a matching relationship that may provide or be the basis for identifying the candidate form object. For example, the form author may have most recently created the two (2) form objects having labels "phone number" and "mobile number". Suppose that, in this example, N is determined to be two (2). In this instance, the form object labels "phone number" and "mobile number" may be used to search the relationships between pre-existing form objects for a matching relationship. Suppose that one relationship between pre-existing form objects is that pre-existing form objects having labels "phone number" and "mobile number" are followed by a pre-existing form object having a label "email address". In this instance, the search of the relationships between pre-existing form objects using the form object labels "phone number" and "mobile number" may identify the relationship that pre-existing form objects having labels "phone number" and "mobile number" are followed by the pre-existing form object having the label "email address" as a matching relationship. Based on the matching relationship, the form object label "email address" (e.g., the phrase) may be used to describe (e.g., identify) a candidate field. The pre-existing form objects may then be searched for pre-existing form objects having labels or descriptions that match the label "email address" (e.g., the description of the candidate field), and the candidate form object may be selected or identified from the matching pre-existing form objects.

In some embodiments, variations of the descriptions or labels of the form objects created in the electronic form (e.g., the N form objects) may be used to search the relationships between pre-existing form objects to identify a matching relationship. The variations may be indicative or otherwise descriptive of the form objects. Continuing the above example, the form author may have most recently created the two (2) form objects having labels "home phone number" and "cell number". Although the labels "home phone number" and "phone number", and the labels "mobile number" and "cell number" may have the same intended meaning, the search of the relationships between pre-existing form objects using the form object labels "home phone number" and "cell number" may fail to identify the relationship that pre-existing form objects having labels "phone number" and "mobile number" are followed by the pre-existing form object having the label "email address" as a matching relationship. In contrast, searching the relationships between pre-existing form objects using the form object labels and variations of the form object labels (e.g., "phone number", "home phone number", "phone no.", "home phone no.", "phone #", "mobile number", "cell number", "mobile #", "cell #", etc.) that describe the intended meaning of the respective form objects may identify the relationship that pre-existing form objects having labels "phone number" and "mobile number" are followed by the pre-existing form object having the label "email address" as a matching relationship. In some embodiments, other constructs or data associated with a form object, such as help text, help content, error message or text, tooltip, etc., may be used to determine the intended meaning of the form object. In some embodiments, the context of a form object may be used to determine the intended meaning of the form object. For example, a form object having a label "name" may have been created in a section of the electronic form titled "spouse information". In this instance, the context of the form object may be used to determine that the intended meaning of the form object is "name of spouse". Using the intended meaning of a form object, including variations of the words that describe the intended meaning, may provide a more efficient search.

In some embodiments, an index of the pre-existing form objects may be generated. For each pre-existing form object, a keyword or keywords may be extracted that describes the pre-existing form object. The keyword or keywords may be determined from a word or a phrase (e.g., label of the pre-existing form object) that describes the meaning of the pre-existing form object. Additional keywords may also be extracted or determined from additional sources associated with the pre-existing form objects, such as help text, error message, tooltip, etc., that may provide a description of the pre-existing form object. For example, the keywords for a pre-existing form object may be derived by identifying the nouns in the description of the pre-existing form object, and using the synonym set of the base words of the nouns as a set of keywords. Techniques such as stemming, lemmatization, and synonym support, to name a few, may be used to determine the base words. The index of the pre-existing form objects may be generated that maintains a mapping between the keywords and the pre-existing form objects. A keyword or keywords may map to one or more pre-existing form objects. The index of the pre-existing form objects may be used to efficiently and comprehensively search the pre-existing form objects. For example, the index may be searched for keywords that match the description (e.g., label) of the candidate field. The candidate form object may be identified from the pre-existing form objects that map to the matched keywords.

For a schema-based form object (e.g., a candidate form object for a field that is tied to a schema element type in the electronic form), in addition to or instead of using the description of the candidate field, the name or description of the schema element type may be used to search for matching pre-existing form object or objects. That is, the description of the candidate field and the name or description of the schema element type or, in some instances, just the name or description of the schema element type, may be used to search the index of pre-existing form objects for a matching keyword or keywords, and the pre-existing form objects that map to the matching keywords. As an example, suppose that the candidate field has a label "name". Also suppose that the candidate field is intended for a field tied to a schema element type "employee name". A search using just the label "name" may result in identifying the pre-existing form objects that map to a keyword or keywords that match or are otherwise close to the label "name". In contrast, a search using the label "name" and the name of the schema element type "employee name" may result in a smarter and more efficient search in that the search identifies the pre-existing form objects that map to a keyword or keywords that match or are otherwise close to the label "name" or the name of the schema element type "employee name". In some embodiments, the search results (e.g., the pre-existing form objects resulting from the search) may be checked to compatibility with the schema element type. The disclosed techniques improve the efficiency, and lower the cost of development, testing, and maintenance of intelligent form creation systems. Numerous configurations and variations will be apparent in light of this disclosure.

System Architecture

Turning now to the figures, FIG. 1 illustrates selected components of an example intelligent form creation system 100, arranged in accordance with at least some embodiments described herein. Intelligent form creation system 100 may facilitate intelligent authoring or creation of electronic forms by automatically predicting a next candidate field and suggesting candidate form objects or, in some embodiments, alternate form objects, for inclusion in an electronic form to create the candidate field. As depicted, intelligent form creation system 100 includes a form authoring module 102, a form object prediction module 104, a form object search module 106, a form object rank module 108, and a pre-existing forms repository 110. In various embodiments, additional components (not illustrated, such as processors, display, user input devices, etc) or a subset of the illustrated components can be employed without deviating from the scope of the present disclosure. For instance, other embodiments may integrate the various functionalities of modules 102, 104, 106, and 108 into fewer modules (e.g., one or two) or more modules (e.g., five or ten, or more). In addition, further note that the various components of system 100 may all be in a stand-alone computing system according to some embodiments, while in others may be distributed across multiple machines. For example, each of the modules 102, 104, 106, and 108 and the repository 110 can be located in a cloud-based server arrangement, and are accessible to a client-based user interface via a communications network. In some cases, one or more of the modules 102, 104, 106, and 108 may be downloaded from a cloud-based service into the browser (or other application) of a client computer for local execution. In a more general sense, the degree of integration and distribution of the functional component(s) provided herein can vary greatly from one embodiment to the next, as will be appreciated in light of this disclosure.

Form authoring module 102 may work in conjunction with various other modules and components of intelligent form creation system 100 to facilitate the intelligent creation of electronic forms. Form authoring module 102 may be configured to monitor the creating or authoring of an electronic form and make recommendations as to a next form object to include (e.g., next field to create) in the electronic form in real-time during the creating or authoring of the electronic form. For example, while a user, such as a form author, is interacting with intelligent form creation system 100 to create an electronic form, form authoring module 102 may monitor the creating of the electronic form to determine whether the form author has created a sufficient number of form objects (e.g., N) to start making predictions as to a candidate field, and recommending a candidate form object to include in the electronic form to create the candidate field. Upon determining that at least N form objects have been created in the electronic form, form authoring module 102 may identify the most recently created N form objects, and provide form object prediction module 104 the N form objects for further processing as described in the various embodiments herein. Form authoring module 102 may receive from object prediction module 104 one or more pre-existing form objects as a result of providing the most recently created N objects. These one or more pre-existing form objects may be used to create the candidate form object in the electronic form. Form authoring module 102 may then identify a candidate form object to recommend to the form author for creation in the electronic form from the one or more pre-existing form objects provided by object prediction module 104.

For example, in the instance where one pre-existing form object is provided, form authoring module 102 may identify the provided pre-existing form object as the candidate form object. In the instance where multiple pre-existing form objects are provided, form authoring module 102 may identify one of the provided multiple pre-existing form objects as the candidate form object. For example, form authoring module 102 may utilize form rank module 108 to rank the provided multiple pre-existing form objects, and select the highest ranking pre-existing form object as the candidate form object. In some embodiments, form authoring module 102 may provide a list of some or all of the multiple provided pre-existing form objects as the candidate form object. In some embodiments, the list of some or all of the multiple provided pre-existing form objects may be a ranked list. In some embodiments, form authoring module 102 may receive from object prediction module 104 one or more alternate form objects. In this instance, form authoring module 102 may provide some or all of the provided alternate form objects to the form author in a manner similar to the candidate form object.

Form object prediction module 104 may be configured to identify relationships between pre-existing form objects that are included in the pre-existing forms. The pre-existing forms may be provided or specified by the form author, for example, contemporaneously or prior to interacting with intelligent form creation system 100 to create an electronic form. In other embodiments, the pre-existing forms may be provided or specified automatically based on, for instance, the identity of the form author and/or the type of form being created, to the extent that information is known. Additionally or alternatively, the pre-existing forms may be existing forms that are generally available for public use, or otherwise accessible to the form creation system. In some instances, form object prediction module 104 may use a combination of the pre-existing forms specified by the form author and/or the form creation request and/or the pre-existing forms that are publically available. In some embodiments, form object prediction module 104 may utilize techniques such as machine learning (e.g., association rule learning) or sequence prediction (e.g., recurrent neural network), to name a few, to identify relationships between pre-existing form objects. For example, form object prediction module 104 may utilize one or more of these techniques to train a network that represents the relationships between pre-existing form objects. Form object prediction module 104 may then use the trained network to predict (identify) a candidate field based on a given (specific) number of form objects.

Form object prediction module 104 may be configured to determine a value for N. For example, form object prediction module 104 may empirically determine the value for N by using different values of N to determine which values of N result in more accurate (e.g., desired) results. In some embodiments, a value for N may be provided by a form author. In this instance, the form author may also empirically determine the value for N by using different values of N to determine which values of N result in more accurate results.

Using N form objects, form object prediction module 104 may attempt to identify a candidate field from the relationships between pre-existing form objects. As discussed above, form authoring module 102 may provide the N form objects (e.g., the preceding N objects created in the electronic form). Form object prediction module 104 may identify a matching relationship from the relationships between pre-existing form objects based on the N form objects. For example, form object prediction module 104 may use the trained network generated using the relationships between pre-existing form objects to identify the matching relationship. Form object prediction module 104 may identify the candidate field from the identified matching relationship, and utilize form object search module 106 to identify pre-existing form objects that match the candidate field.

Form object prediction module 104 may provide form authoring module 102 the identified pre-existing form objects that match the candidate field.

In some embodiments, form object prediction module 104 may be configured to identify one or more pre-existing form objects that are similar to the pre-existing form objects that match the candidate field. For example, form object prediction module 104 may identify one or more alternate fields that are close in meaning to the candidate field. Form object prediction module 104 may identify the alternate fields based on the meaning (e.g., label, description, and the like) of the candidate field. Form object prediction module 104 may utilize form object search module 106 to identify pre-existing form objects that match the alternate fields. Form object prediction module 104 may provide form authoring module 102 the identified pre-existing form objects that match the one or more alternate fields.

Form object search module 106 may be configured to search the pre-existing form objects to identify the pre-existing form object or objects that match certain criteria. For example, the pre-existing form objects may be searched to identify the pre-existing form objects that match the candidate field (e.g., a description of the candidate field). In some instances, the criteria may be the alternate field, and form object search module 106 may search the pre-existing form objects identify the pre-existing form objects that match the alternate field (e.g., a description of the alternate field). In some instances, the criteria may be a definition of a schema (e.g., schema element type). For example, provided a description (e.g., a name) of the schema element type, form object search module 106 may search the pre-existing form objects to identify the pre-existing form object or objects that match the description of the schema element type.

In some embodiments, form object search module 106 may be configured to generate an index of the pre-existing form objects. The index may be an index of keywords that describe the pre-existing form objects. For example, form object search module 106 may extract one or more keywords from the descriptions of each of the pre-existing form objects, and maintain a mapping between the keywords and the pre-existing form objects. Form object search module 106 may then use the generated index to efficiently and comprehensively search the pre-existing form objects.

In some embodiments, form object search module 106 may be configured to check pre-existing form objects, such as the pre-existing form objects that result or are identified as a result of a search, for compatibility with a schema element type (e.g., compatibility check) to filter or prune the pre-existing form objects (e.g., search results). For example, provided a description of the schema element type that the pre-existing form object or objects should conform to, form object search module 106 may check each pre-existing form object that results from a search to determine whether the pre-existing form object is compatible with the schema element type. As an example, suppose that a label of a next field (e.g., form object) to be created in the electronic form is "age", and that this field is tied to a schema element type "number". Also suppose that the search of the pre-existing form objects (e.g., search of the pre-existing form objects that match the label "age") resulted in two (2) pre-existing form objects, a first pre-existing form object being a text field into which a user can enter alphanumeric characters, and a second pre-existing form object being a list menu that displays a list of numbers from which a user can select to indicate the age. Form object search module 102 may compatibility check the search results (e.g., the first pre-existing form object and the second pre-existing form object) for compatibility with the schema element type "number". In some embodiments, form object search module 106 may prune the pre-existing form objects that are not compatible with the schema element type from the search results. In some embodiments, form object search module 106 may rank the pre-existing form objects based on a relative degree of compatibility with the schema element type, and provide a ranked list of the pre-existing form objects as the search results.

Form object rank module 108 may be configured to rank form objects based on performance scores. For example, form authoring module 102 may provide form object rank module 108 multiple pre-existing form objects to rank. The multiple pre-existing form objects may have been identified by form object search module 106 as potential candidate form objects (e.g., the pre-existing form objects that match the candidate field). A performance score for each pre-existing form object may be computed based on one or more analytics metrics such as error rate (e.g., measure of the number of times users make errors when using the pre-existing form object), abandonment rate (e.g., measure of the number of times users quit completing the electronic form upon encountering the pre-existing form object), average fill time (e.g., measure of average time taken for users to use or complete the pre-existing form object), fill frequency (e.g., measure of the number of times users use or complete the pre-existing form object), and the like. In some embodiments, different weights may be assigned to the various analytics metrics. For example, error rate may be given more weight than abandonment rate in computing the performance score. In some embodiments, the different weights assigned to the various analytics metrics may be based on a type of electronic form being created. In some embodiments, the form author may provide the weights to be assigned to the various analytics metrics.

Pre-existing forms repository 110 may be a repository for the pre-existing forms as well as other data, such as the index of pre-existing form objects, which may be used by intelligent form creation system 100. Pre-existing forms repository 110 may be implemented using any computer-readable storage media suitable for carrying or having data or data structures stored thereon.

While various aspects and embodiments of intelligent form creation system 100, including form authoring module 102, form object prediction module 104, form object search module 106, form object rank module 108, and pre-existing forms repository 110 have been described above with reference to FIG. 1, other aspects and embodiments will be apparent to those skilled in the art. For example, those skilled in the art will appreciate that some or all of the operations of or functions performed by one module of intelligent form creation system 100 as described above may be performed by one or more other modules of intelligent form creation system 100. Furthermore, the described operations and functions are only provided as examples, and some of the steps and operations and functions may be optional, combined into fewer operations and functions, or expanded into additional operations and functions without detracting from the spirit and scope of the present disclosure.

Figure 2:
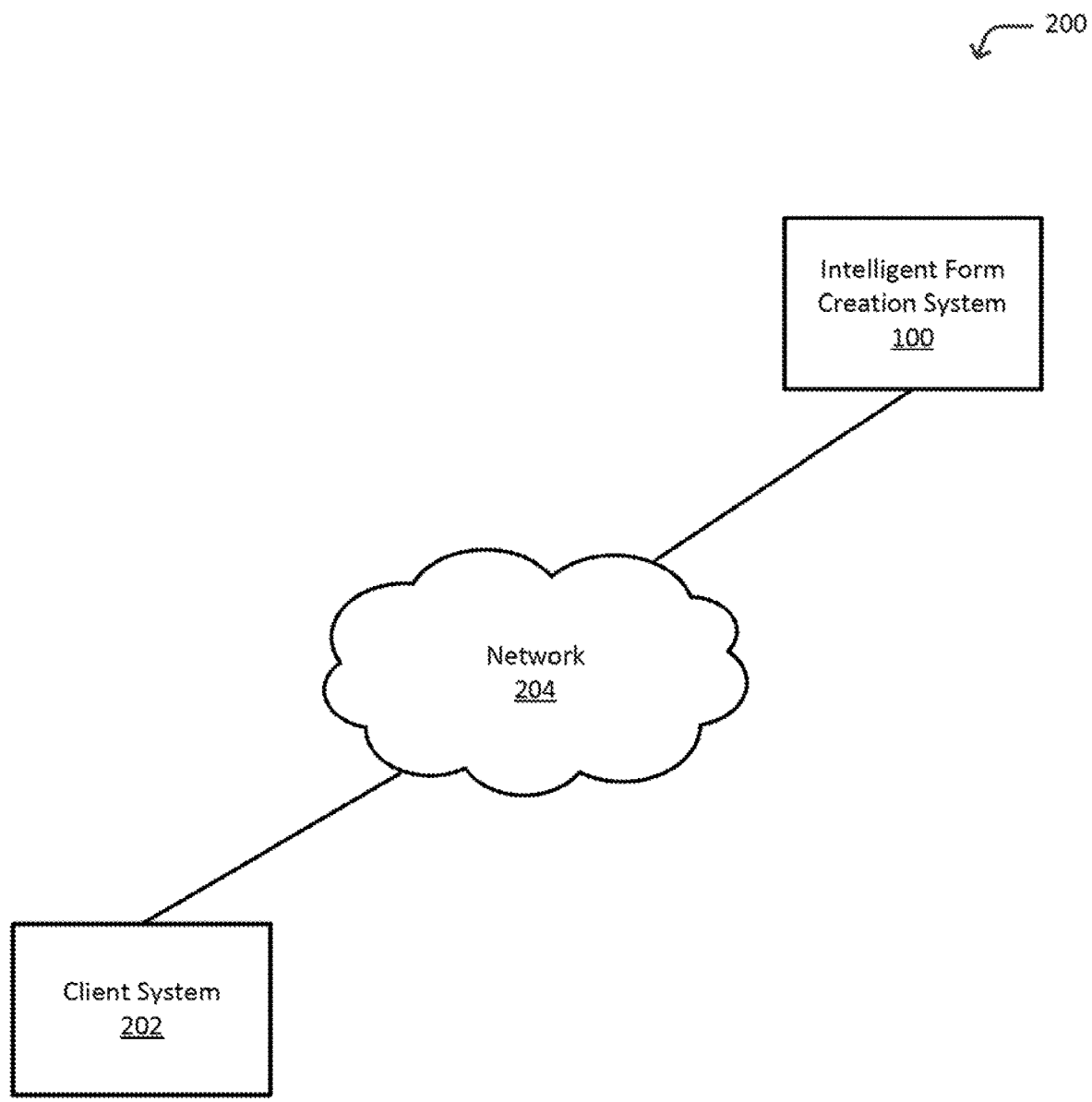
FIG. 2 illustrates an overview of an environment in which the intelligent form creation system may operate, in accordance with at least some embodiments described herein.

FIG. 2 illustrates an overview of an environment 200 in which intelligent form creation system 100 may operate, in accordance with at least some embodiments described herein. Environment 200 may include a client system 202 operatively coupled to intelligent form creation system 100 through a network 204. Network 204 can be one or more of a local area network, a wide area network, the Internet, and/or other wired or wireless networks. For example, a form author may execute an application program to use and/or interact with intelligent form creation system 100. The provider of intelligent form creation system 100 may provide the application program. The application program may include a graphical user interface (GUI), including graphical elements, for use in interacting with intelligent form creation system 100, including form authoring module 102 of intelligent form creation system 100, to create electronic forms. For example, using the GUI, the form author may submit a request to create an electronic form, provide or specify the pre-existing forms, create the electronic form, select a representation of the recommended candidate form object displayed on the GUI to cause the candidate form object to be created in the electronic form, and/or perform other operations and interactions with intelligent form creation system 100. In some instances intelligent form creation system 100 may include a Web interface through which aspects of intelligent form creation system 100 may be accessed through the use of a Web browser application program.

Figure 3:
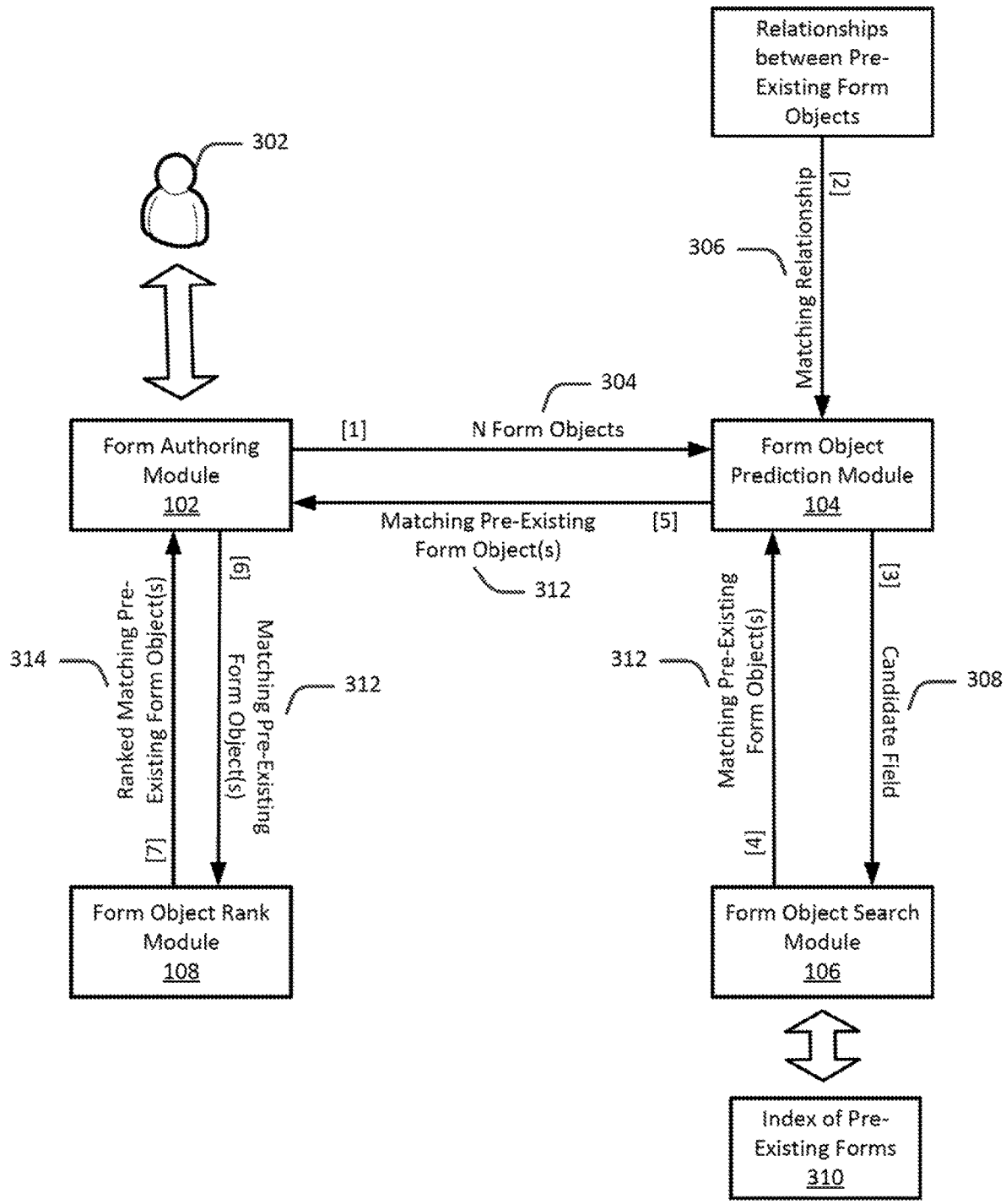
FIG. 3 illustrates example interactions between selected components of an example intelligent form creation system to recommend a candidate form object, in accordance with at least some embodiments described herein.

FIG. 3 illustrates example interactions between selected components of intelligent form creation system 100 to recommend a candidate form object, in accordance with at least some embodiments described herein. Form authoring module 102 may be monitoring the creating of an electronic form using intelligent form creation system 100 by a form author 302. Form authoring module 102 may determine that a sufficient number of form objects (e.g., at least N) have been created in the electronic form, and identify a preceding N form objects created in the electronic form (e.g., most recently created N form objects). Form authoring module 102 sends form object prediction module 104 N form objects 304 with a request for a prediction as to a next form field to create in the electronic form from the known relationships between pre-existing form objects based in the N form objects [1]. Form object prediction module 104 identifies a matching relationship 306 from the relationships between pre-existing form objects 110 based on the N form objects [2]. Form object prediction module 104 identifies a candidate field 308 from matching relationship 306, and sends form object search module 106 candidate field 308 with a request for pre-existing form objects that match candidate field 308 [3]. Form object search module 106 searches the pre-existing form objects for pre-existing form objects that match candidate field 308. If an index 310 of pre-existing form objects is available, form object search module 106 may search index 310 for pre-existing form objects that match candidate field 310. Form object search module 106 sends form object prediction module 104 matching pre-existing form objects 312 [4]. In some embodiments, form object search module 106 may request form object rank module 108 to rank the matching pre-existing form objects, and, in response, form object rank module 108 may provide a ranked list of matching pre-existing form objects ranked based on one or more analytics metrics.

Form object prediction module 104 sends form authoring module 102 matching pre-existing form objects 312 [5]. If matching pre-existing form objects 312 includes one pre-existing form object, form authoring module 102 identifies the pre-existing form object as a candidate form object, and recommends the candidate form object to form author 302 for inclusion in the electronic form. If matching pre-existing form objects 312 includes multiple pre-existing form objects, form authoring module 102 sends form object rank module 108 matching pre-existing form objects 312 with a request for a ranking of matching pre-existing form objects 312 [6]. Form object rank module 108 ranks the matching pre-existing form objects 312 based on one or more analytics metrics, and sends form authoring module 102 a ranked matching pre-existing form objects 314 [7]. Form authoring module 102 identifies one or more pre-existing form object from ranked matching pre-existing form objects 314 as a candidate form object, and recommends the candidate form object to form author 302 for inclusion in the electronic form. It will be appreciated that the interactions between the components described above is provided to give one example embodiment and is not intended to limit the descriptions of the other embodiments of the present disclosure.

Figure 4:
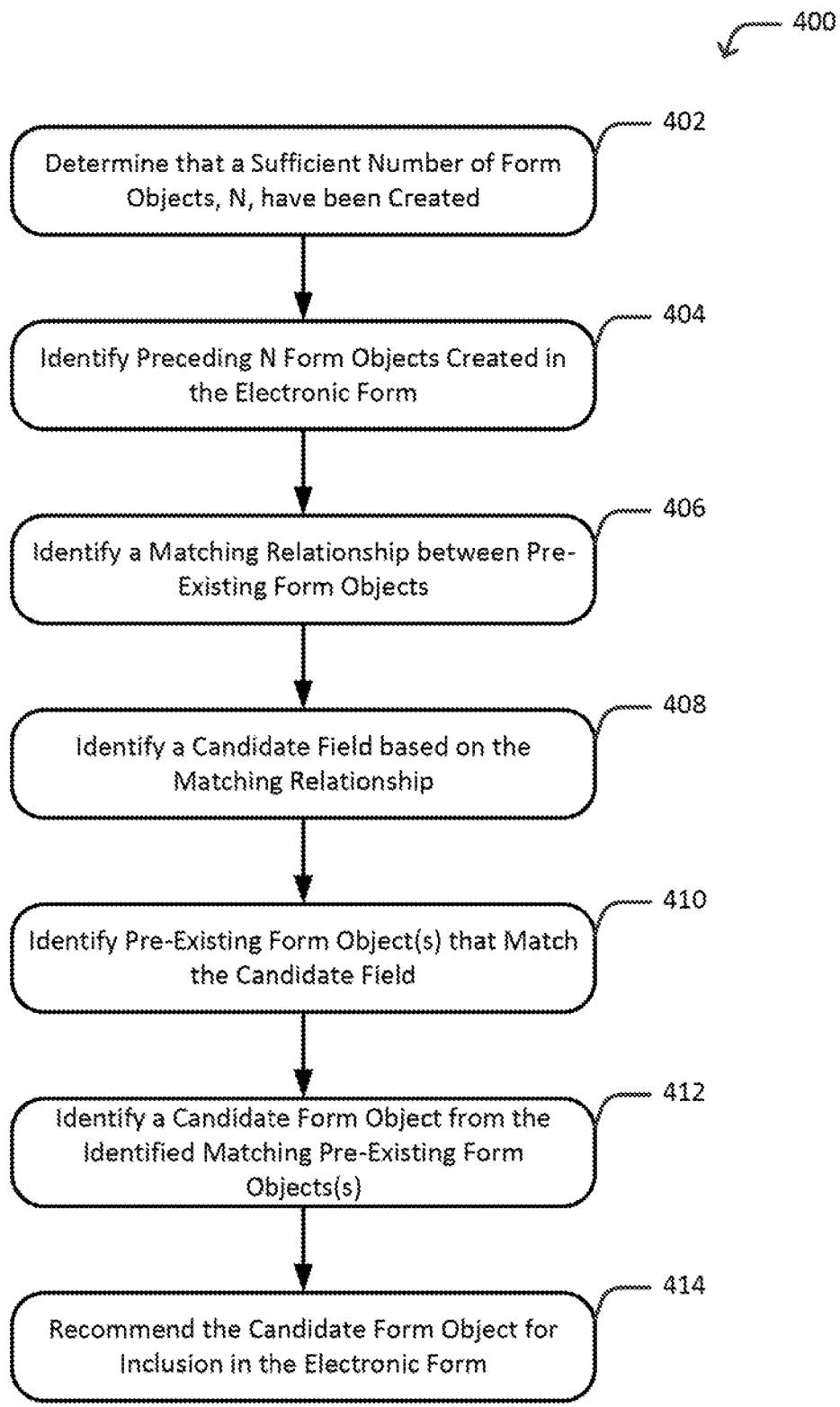
FIG. 4 is a flow diagram that illustrates an example process to recommend a candidate form object, in accordance with at least some embodiments described herein.

FIG. 4 is a flow diagram 400 that illustrates an example process to recommend a candidate form object, in accordance with at least some embodiments described herein. Example processes and methods may include one or more operations, functions or actions as illustrated by one or more of blocks 402, 404, 406, 408, 410, 412 and/or 414, and may in some embodiments be performed by a computing system such as a computing system 500 of FIG. 5. Recall the computing system may be a stand-alone computing system (e.g., FIG. 5, or a distributed computing system (e.g., FIG. 2). The operations described in blocks 402-414 may also be stored as computer-executable instructions in a computer-readable medium, such as a memory 504 and/or a data storage 506 of computing system 500. The process may be performed by intelligent form creation system 100.

As depicted by flow diagram 400, the process may begin with block 402, determine that a sufficient number of form objects, N, have been created in the electronic form. For example, a form author may be using intelligent form creation system 100 to create an electronic form. In real-time, during the creating of the electronic form, form authoring module 102 may determine that at least N form objects have been created in the electronic form. As will be appreciated, N may be any integer number, such as 2, 3, etc.

Block 402 may be followed by block 404, identify the preceding N (e.g., the most recent N) form objects created in the electronic form. Form authoring module 102 may identify the preceding N form objects created in the electronic form. Form authoring module 102 may provide the identified N form objects to form object prediction module 104 for a prediction as to a field to create next in the electronic form.

Block 404 may be followed by block 406, identify a matching relationship between pre-existing form objects. Form object prediction module 104 may identify a relationship between pre-existing form objects from the relationships between pre-existing form object based on the N form objects. The identified relationship is a matching relationship.

Block 406 may be followed by block 408, identify a candidate field based on the matching relationship. Form object prediction module 104 may identify a candidate field from the matching relationship. Form object prediction module 104 may provide the candidate field to form object search module 104 for identification of pre-existing form objects that match the candidate field.

Block 408 may be followed by block 410, identify pre-existing form objects that match the candidate field. Form object search module 106 may perform a search of the pre-existing form objects to identify pre-existing form objects that match the candidate field. Any one of the matching pre-existing form objects may be used to create the candidate field, for example, in the electronic form. Form object search module 106 may provide the identified matching pre-existing form objects to form object prediction module 104. Form object prediction module 104 may provide the identified matching pre-existing form objects to form authoring module 102.

Block 410 may be followed by block 412, identify a candidate form object from the identified matching pre-existing form objects. Form authoring module 102 may identify a candidate form object to recommend to the form author from among the identified matching pre-existing form objects. In some embodiments, form authoring module 102 may identify a candidate form object based on a ranking of the matching pre-existing form object. For example, the matching pre-existing form object may be ranked based on one or more analytics metrics.

Block 412 may be followed by block 414, recommend the candidate form object for inclusion in the electronic form. Form authoring module 102 may recommend the candidate form object to the form author for inclusion in the electronic form. For example, form authoring module 102 may present a representation of the candidate form object for viewing by the form author.

Those skilled in the art will appreciate that, for this and other processes and methods disclosed herein, the functions performed in the processes and methods may be implemented in differing order. Additionally or alternatively, two or more operations may be performed at the same time. Furthermore, the outlined actions and operations are only provided as examples, and some of the actions and operations may be optional, combined into fewer actions and operations, or expanded into additional actions and operations without detracting from the essence of the disclosed embodiments.

Figure 5:
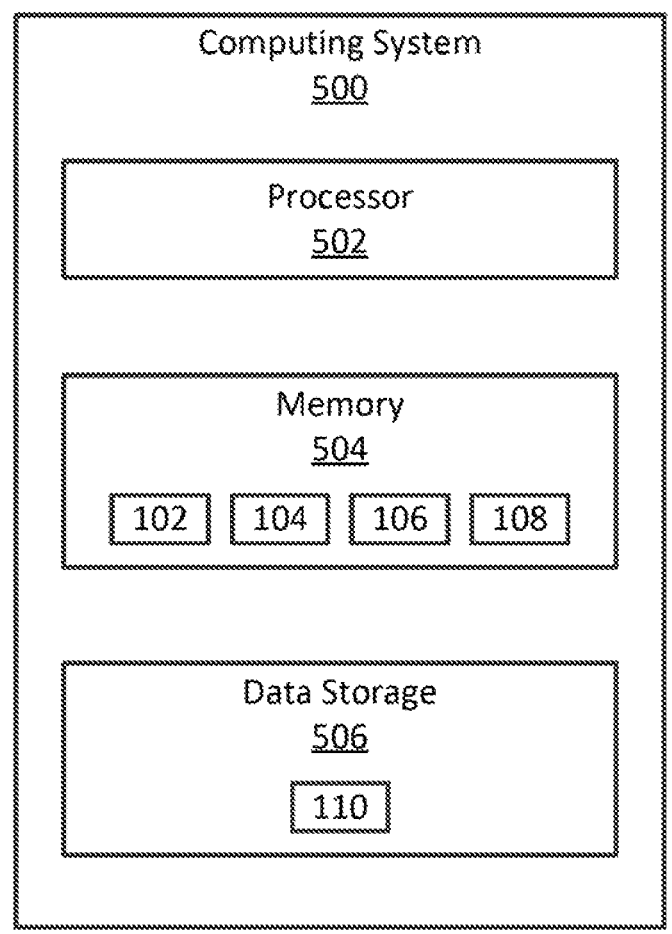
FIG. 5 illustrates selected components of an example computing system that may be used to perform any of the techniques as variously described in the present disclosure, in accordance with at least some embodiments described herein.

FIG. 5 illustrates selected components of an example computing system 500 that may be used to perform any of the techniques as variously described in this disclosure. In some embodiments, computing system 500 may be configured to implement or direct one or more operations associated with some or all of the components and/or modules associated with intelligent form creation system 100 of FIG. 1. For example, form authoring module 102, form object prediction module 104, form object search module 106, form object rank module 108, pre-existing forms repository 110, or any combination of these may be implemented in and/or using computing system 500. In one example case, for instance, each of modules 102, 104, 106, and 108 is loaded in memory 504 and executable by processor 502, and repository 110 is included in data storage 506. Computing system 500 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 500 may include a processor 502, memory 504, and data storage 506. Processor 502, memory 504, and data storage 506 may be communicatively coupled.

In general, processor 502 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, processor 502 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 502 may be configured to interpret and/or execute program instructions and/or process data stored in memory 504, data storage 506, or memory 504 and data storage 506. In some embodiments, processor 502 may fetch program instructions from data storage 506 and load the program instructions in memory 504. After the program instructions are loaded into memory 504, processor 502 may execute the program instructions.

For example, in some embodiments, any one or more of the components and/or modules of intelligent form creation system 100 may be included in data storage 506 as program instructions. Processor 502 may fetch some or all of the program instructions from the data storage 506 and may load the fetched program instructions in memory 504. Subsequent to loading the program instructions into memory 504, processor 502 may execute the program instructions such that the computing system may implement the operations as directed by the instructions.

In some embodiments, virtualization may be employed in computing device 500 so that infrastructure and resources in computing device 500 may be shared dynamically. For example, a virtual machine may be provided to handle a process running on multiple processors so that the process appears to be using only one computing resource rather than multiple computing resources. Multiple virtual machines may also be used with one processor.

Memory 504 and data storage 506 may include computer-readable storage media for carrying or having computer-executable instructions or data structures stored thereon. Such computer-readable storage media may include any available media that may be accessed by a general-purpose or special-purpose computer, such as processor 502. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 502 to perform a certain operation or group of operations.

Modifications, additions, or omissions may be made to computing system 500 without departing from the scope of the present disclosure. For example, in some embodiments, computing system 500 may include any number of other components that may not be explicitly illustrated or described herein.

As indicated above, the embodiments described in the present disclosure may include the use of a special purpose or a general purpose computer (e.g., processor 502 of FIG. 5) including various computer hardware or software modules, as discussed in greater detail herein. Further, as indicated above, embodiments described in the present disclosure may be implemented using computer-readable media (e.g., memory 504 of FIG. 5) for carrying or having computer-executable instructions or data structures stored thereon.

A number of benefits associated with some embodiments of the present disclosure will be appreciated. For example, as one of many benefits, in some embodiments, the techniques facilitate the accelerated creation and use of accurate electronic forms by automatically recommending relevant form objects for inclusion in the electronic forms. The techniques recommend form objects that have been pre-tested for proper operation in electronic forms (e.g., the form objects have been used and tested in pre-existing electronic forms) and/or usability based on various analytics metrics. Accordingly, the techniques reduce errors in the electronic forms creating process. In some embodiments, the techniques accelerate the digitization of business processes, including the use of electronic forms for data capture and management, by leveraging the knowledge contained in pre-existing forms. The leverage is further realized by using the meanings or semantics of form fields and form objects. In some embodiments, the techniques automate the mapping of a schema to form objects as a part of recommending the form objects for inclusion in electronic forms. Numerous other such benefits, applications, and use cases will be apparent in light of this disclosure, and the present disclosure is not intended to be limited to any particular ones.

Numerous example variations and configurations will be apparent in light of this disclosure. According to some examples, computer-implemented methods to automatically recommend a candidate form object to include in an electronic form are described. An example computer-implemented method may include: receiving a request to create an electronic form; identifying a preceding N form objects created in the electronic form; identifying a candidate form object based on the identified preceding N form objects created in the electronic form and one or more relationships between pre-existing form objects, the pre-existing form objects being included in multiple pre-existing forms, the candidate form object being one of the pre-existing form objects; and recommending the candidate form object for creation in the electronic form.

In some examples, the method may also include: generating an index of the pre-existing form objects. In other examples, generating an index of the pre-existing form objects may include: extracting one or more keywords for each pre-existing form object of the pre-existing form objects; and maintaining a mapping between the one or more keywords and the pre-existing form objects. In other examples, at least one keyword of the one or more keywords is based on a description or a label of one pre-existing form object of the pre-existing form objects. In still other examples, at least one keyword of the one or more keywords is based on a meaning of one pre-existing form object of the pre-existing form objects. In further examples, at least one keyword of the one or more keywords is based on one or more of a help content, an error message, and a tooltip associated with one pre-existing form object of the pre-existing form objects.

In some examples, identifying the candidate form object may include: identifying multiple pre-existing form objects that match a description of a field to recommend for creating in the electronic form; and ranking the identified multiple matching pre-existing form objects; wherein the candidate form object is a highest ranked matching pre-existing form object of the identified multiple matching pre-existing form objects. In other examples, the ranking is based on one or more of an error rate, an average fill time, an abandonment rate, and a fill frequency measure. In some examples, identifying the candidate form object comprises searching the index of pre-existing form objects for pre-existing form objects that match a schema element type. In other examples, the method may also include identifying the one or more relationships between pre-existing form objects. In still other examples, the method may also include identifying the pre-existing forms based on information associated with the request, the information including one or more of a form type indicating the type of electronic form being created, an ID indicating the identity of an author creating the electronic form, and/or an ID indicating the identity of a group to which belongs an author creating the electronic form.

According to some examples, computer program products including one or more non-transitory machine readable mediums encoded with instructions that when executed by one or more processors cause a process to be carried out to automatically recommend a candidate form object to include in an electronic form are described. An example process may include: receiving a request to create an electronic form; generating an index of the pre-existing form objects; identifying a preceding N form objects created in the electronic form; identifying a candidate form object based on the identified preceding N form objects created in the electronic form and one or more relationships between pre-existing form objects, the pre-existing form objects being included in a plurality of pre-existing forms, the candidate form object being one of the pre-existing form objects; and recommending the candidate form object for creation in the electronic form.

In some examples, the process may also include generating an index of the multiple pre-existing form objects by: extracting one or more keywords for each pre-existing form object of the pre-existing form objects; and maintaining a mapping between the one or more keywords and the pre-existing form objects. In other examples, at least one keyword of the one or more keywords is based on a description or a label of one pre-existing form object of the pre-existing form objects. In still other examples, at least one keyword of the one or more keywords is based on a meaning of one pre-existing form object of the pre-existing form objects. In further examples, at least one keyword of the one or more keywords is based on one or more of a help content, an error message, and a tooltip associated with one pre-existing form object of the pre-existing form objects.

In other examples, the process may also include: identifying an alternate form object based on the identified preceding N form objects created in the electronic form and the one or more relationships between pre-existing form objects, the alternate form object being another pre-existing form object of the pre-existing form objects; and recommending the alternate form object for creation in the electronic form.

According to other examples, systems to provide automatic recommendation of a candidate form object to include in an electronic form are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: receive a request to create an electronic form; identify one or more relationships between pre-existing form objects, each relationship of the one or more relationships being between multiple pre-existing form objects, the pre-existing form objects being included in multiple pre-existing forms; identify a preceding N form objects created in the electronic form; identify a candidate form object based on a match of the identified preceding N form objects created in the electronic form and the one or more relationships between pre-existing form objects, the candidate form object being a pre-existing form object of the pre-existing form objects; and recommend the candidate form object for creation in the electronic form.

In some examples, the one or more non-transitory machine readable mediums may further store instructions that, in response to execution by the one or more processors, cause the one or more processors to: identify multiple pre-existing form objects that match a description of a field to recommend for creating in the electronic form; and rank the identified multiple matching pre-existing form objects; wherein the candidate form object is a highest ranked matching pre-existing form object of the identified multiple matching pre-existing form objects. In other examples, the rank is based on one of an error rate, an average fill time, or a fill frequency measure.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to automatically recommend a candidate form object to include in an electronic form, the method comprising:
   receiving a request to create an electronic form;
   identifying a preceding N form objects created in the electronic form;
   identifying a plurality of pre-existing form objects included in a plurality of pre-existing forms, wherein a particular form object is included in both the preceding N form objects and the plurality of pre-existing form objects;
   identifying a candidate form object from amongst the plurality of pre-existing form objects, wherein a relationship exists between the candidate form object and the particular form object in one of the pre-existing forms, wherein the relationship defines a sequence such that the particular form object appears before the candidate form object in at least one of the pre-existing forms, and wherein inserting the candidate form object into the electronic form would cause the relationship to exist in the electronic form as well; and
   recommending the candidate form object for creation in the electronic form.

2. The method of claim 1, further comprising generating an index of the pre-existing form objects.

3. The method of claim 2, wherein generating the index of the pre-existing form objects comprises:
   extracting one or more keywords for each pre-existing form object of the pre-existing form objects; and
   maintaining a mapping between the one or more keywords and the pre-existing form objects.

4. The method of claim 3, wherein at least one keyword of the one or more keywords is based on a description or a label of one pre-existing form object of the pre-existing form objects.

5. The method of claim 3, wherein at least one keyword of the one or more keywords is based on a meaning of one pre-existing form object of the pre-existing form objects.

6. The method of claim 3, wherein at least one keyword of the one or more keywords is based on one or more of a help content, an error message, and a tooltip associated with one pre-existing form object of the pre-existing form objects.

7. The method of claim 1, wherein identifying the candidate form object comprises:
identifying a subset of the pre-existing form objects, wherein the relationship exists between the particular form object and each of the pre-existing form objects in the subset; and
ranking each of the pre-existing form objects in the subset;
wherein the candidate form object is a highest ranked pre-existing form object of the pre-existing form objects in the subset.

8. The method of claim 7, wherein the pre-existing form objects in the subset are ranked based on one or more of an error rate, an average fill time, an abandonment rate, and a fill frequency measure.

9. The method of claim 2, wherein identifying the candidate form object comprises searching the index of pre-existing form objects for pre-existing form objects that match a schema element type.

10. The method of claim 1, further comprising identifying the relationship between the candidate form object and the particular form object.

11. The method of claim 1, further comprising identifying the pre-existing forms based on information associated with the request, the information including one or more of a type of the electronic form, an ID indicating an identity of an author creating the electronic form, and/or an ID indicating a group to which the author belongs.

12. A computer program product including one or more non-transitory machine readable mediums encoded with instructions that when executed by one or more processors cause a process to be carried out to automatically recommend a candidate form object to include in an electronic form, the process comprising:
receiving a request to create an electronic form;
identifying a preceding N form objects created in the electronic form;
identifying a plurality of pre-existing form objects included in a plurality of pre-existing forms, wherein a particular form object is included in both the preceding N form objects and the plurality of pre-existing form objects;
identifying a candidate form object from amongst the plurality of pre-existing form objects, wherein a relationship exists between the candidate form object and the particular form object in one of the pre-existing forms, wherein the relationship defines a sequence such that the particular form object appears before the candidate form object in at least one of the pre-existing forms, and wherein inserting the candidate form object into the electronic form would cause the relationship to exist in the electronic form as well; and
recommending the candidate form object for creation in the electronic form.

13. The computer program product of claim 12, wherein the process further comprises generating an index of the plurality of pre-existing form objects by:
extracting one or more keywords for each pre-existing form object of the pre-existing form objects; and
maintaining a mapping between the one or more keywords and the pre-existing form objects.

14. The computer program product of claim 13, wherein at least one keyword of the one or more keywords is based on a description or a label of one pre-existing form object of the pre-existing form objects.

15. The computer program product of claim 13, wherein at least one keyword of the one or more keywords is based on a meaning of one pre-existing form object of the pre-existing form objects.

16. The computer program product of claim 13, wherein at least one keyword of the one or more keywords is based on one or more of a help content, an error message, and a tooltip associated with one pre-existing form object of the pre-existing form objects.

17. The computer program product of claim 12, wherein the process further comprises:
identifying an alternate form object from amongst the plurality of pre-existing form objects, wherein the relationship also exists between the alternate form object and the particular form object in one of the pre-existing forms, and wherein inserting the alternate form object into the electronic form would cause the relationship to exist in the electronic form as well; and
recommending the alternate form object for creation in the electronic form.

18. A system to provide automatic recommendation of a candidate form object to include in an electronic form, the system comprising:
one or more non-transitory machine readable mediums configured to store instructions; and
one or more processors configured to execute the instructions stored on the one or more non-transitory machine readable mediums, wherein execution of the instructions causes the one or more processors to:
receive a request to create an electronic form;
identify a preceding N form objects created in the electronic form;
identify a plurality of pre-existing form objects included in a plurality of pre-exiting forms, wherein a particular form object is included in both the preceding N form objects and the plurality of pre-existing form objects;
identifying a candidate form object from amongst the plurality of pre-existing form objects, wherein a relationship exists between the candidate form object and the particular form object in one of the pre-existing forms, wherein the relationship defines a sequence such that the particular form object appears before the candidate form object in at least one of the pre-existing forms, and wherein inserting the candidate form object into the electronic form would cause the relationship to exist in the electronic form as well; and
recommend the candidate form object for creation in the electronic form.

19. The system of claim 18, wherein the one or more non-transitory machine readable mediums further stores instructions that, in response to execution by the one or more processors, cause the one or more processors to:

identify a subset of the pre-existing form objects, wherein the relationship exists between the particular form object and each of the pre-existing form objects in the subset; and rank each of the pre-existing form objects in the subset;

wherein the candidate form object is a highest ranked pre-existing form object of the pre-existing form objects in the subset.

20. The system of claim 19, wherein the pre-existing form objects in the subset are ranked based on one of an error rate, an average fill time, or a fill frequency measure.

* * * * *